(12) United States Patent
Chen et al.

(10) Patent No.: US 10,427,345 B2
(45) Date of Patent: Oct. 1, 2019

(54) CONTINUOUS FABRICATION SYSTEM AND METHOD FOR HIGHLY ALIGNED POLYMER FILMS

(71) Applicant: Massachusetts Institute of Technology, Cambridge, MA (US)

(72) Inventors: Gang Chen, Carlisle, MA (US); Jianjian Wang, Cambridge, MA (US); Jonathan Kien-Kwok Tong, Cambridge, MA (US); Hadi Ghasemi, Boston, MA (US); Xiaopeng Huang, Cambridge, MA (US); James Loomis, Boston, MA (US); Yanfei Xu, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 350 days.

(21) Appl. No.: 14/700,284

(22) Filed: Apr. 30, 2015

(65) Prior Publication Data
US 2015/0321408 A1    Nov. 12, 2015

Related U.S. Application Data

(60) Provisional application No. 61/989,588, filed on May 7, 2014.

(51) Int. Cl.
*B29C 47/00* (2006.01)
*C08J 5/18* (2006.01)
(Continued)

(52) U.S. Cl.
CPC .......... *B29C 48/0018* (2019.02); *B29C 48/08* (2019.02); *B29C 48/914* (2019.02);
(Continued)

(58) Field of Classification Search
CPC ............ B29C 47/0057; B29C 47/8845; B29C 47/0021; B29C 47/884; B29C 47/0004;
(Continued)

(56) References Cited

U.S. PATENT DOCUMENTS 3,817,671 A * 6/1974 Lemelson ................. B26F 1/24
425/290
4,014,636 A * 3/1977 Pawelczyk .............. B29C 43/24
425/217
(Continued)

FOREIGN PATENT DOCUMENTS

WO    WO 2007122010 A2 *  11/2007    .......... F41H 5/0428
WO          0173173 A1    10/2011

OTHER PUBLICATIONS

International Written Opinion for PCT/US15/29162 dated May 7, 2014.*
(Continued)

*Primary Examiner* — Anthony Calandra
*Assistant Examiner* — Jerzi H Moreno Hernandez
(74) *Attorney, Agent, or Firm* — Theresa A. Lober (57) ABSTRACT

Process for continuous fabrication of highly aligned polymer films. A polymer-solvent solution is subjected to a high shear, high temperature, Couette flow to extrude a thin film having polymer chain disentanglement. The extruded thin film is frozen and the solvent is allowed to evaporate to form a dried film. The dried film is mechanically drawn using a constant force, adaptive-thickness drawing system to align polymer molecular chains through plastic deformation. A suitable polymer is ultra-high molecular weight polyethylene.

14 Claims, 7 Drawing Sheets

(51) Int. Cl.
<table>
<tr><td>B29C 48/00</td><td>(2019.01)</td></tr>
<tr><td>C08K 3/04</td><td>(2006.01)</td></tr>
<tr><td>H01B 1/24</td><td>(2006.01)</td></tr>
<tr><td>C09K 5/14</td><td>(2006.01)</td></tr>
<tr><td>B29C 55/06</td><td>(2006.01)</td></tr>
<tr><td>B29C 55/18</td><td>(2006.01)</td></tr>
<tr><td>B29C 48/08</td><td>(2019.01)</td></tr>
<tr><td>B29C 48/88</td><td>(2019.01)</td></tr>
<tr><td>B29L 7/00</td><td>(2006.01)</td></tr>
<tr><td>D01F 6/04</td><td>(2006.01)</td></tr>
<tr><td>D01F 6/06</td><td>(2006.01)</td></tr>
<tr><td>B29K 23/00</td><td>(2006.01)</td></tr>
<tr><td>B29C 55/00</td><td>(2006.01)</td></tr>
</table>

(52) U.S. Cl.
CPC .......... *B29C 48/9135* (2019.02); *B29C 55/06* (2013.01); *B29C 55/18* (2013.01); *C08J 5/18* (2013.01); *C08K 3/04* (2013.01); *C08K 3/042* (2017.05); *C09K 5/14* (2013.01); *H01B 1/24* (2013.01); *B29C 48/022* (2019.02); *B29C 55/005* (2013.01); *B29K 2023/0683* (2013.01); *B29K 2995/005* (2013.01); *B29K 2995/0005* (2013.01); *B29K 2995/0077* (2013.01); *B29L 2007/008* (2013.01); *C08J 2323/06* (2013.01); *D01F 6/04* (2013.01); *D01F 6/06* (2013.01); *D07B 2205/201* (2013.01); *D07B 2205/2014* (2013.01)

(58) Field of Classification Search
CPC ....... B29C 55/06; B29C 55/18; B29C 55/005; B29C 71/02; B29K 2995/005; B29K 2023/0683; B29K 2995/0077; B29K 2995/0005; B29L 2007/008; C08J 5/18; C08J 2323/06; C08K 3/04; C09K 5/14; H01B 1/24
See application file for complete search history.

(56) References Cited

U.S. PATENT DOCUMENTS

| | | | | |
|---|---|---|---|---|
| 4,053,270 A * | 10/1977 | Collier | ............... | B29C 55/00 425/144 |
| 4,136,214 A * | 1/1979 | Bourelier | ............... | B29C 47/885 427/169 |
| 4,137,394 A * | 1/1979 | Meihuizen | ............... | D01D 5/40 117/23 |
| 4,344,908 A * | 8/1982 | Smith | ............... | B29C 70/10 264/203 |
| 4,807,964 A * | 2/1989 | Sare | ............... | B29C 47/0014 385/143 |
| 4,938,911 A * | 7/1990 | Bastiaansen | ............... | B29C 47/0004 264/178 R |
| 4,973,442 A * | 11/1990 | Harvey | ............... | B29C 47/0021 264/102 |
| 5,133,922 A * | 7/1992 | Kaeufer | ............... | B29C 55/18 264/280 |
| 5,399,308 A * | 3/1995 | Woodhams | ............... | B29C 55/005 264/210.2 |
| 5,736,209 A * | 4/1998 | Andersen | ............... | B05B 11/0037 428/152 |
| 5,807,516 A * | 9/1998 | Wolstenholme | ............... | B29C 47/0004 264/210.2 |
| 2002/0160268 A1* | 10/2002 | Yamaguchi | ............... | C08J 5/18 429/254 |
| 2004/0051199 A1* | 3/2004 | Kellenberger | ............... | A61F 13/4902 264/166 |
| 2007/0016251 A1* | 1/2007 | Roby | ............... | A61L 17/04 606/228 |
| 2008/0020192 A1* | 1/2008 | Yen | ............... | B01D 67/0018 428/220 |
| 2009/0261498 A1* | 10/2009 | Rheinnecker | ............... | D01F 11/02 264/176.1 |
| 2010/0301258 A1* | 12/2010 | Chen | ............... | C08J 5/18 252/67 |
| 2011/0212316 A1* | 9/2011 | Gorp Van | ............... | B29C 47/0021 428/220 |
| 2011/0244206 A1* | 10/2011 | Penache | ............... | B29B 9/02 428/220 |
| 2013/0012598 A1* | 1/2013 | Velev | ............... | D01F 1/10 514/772.4 |
| 2015/0005405 A1* | 1/2015 | Ishihara | ............... | H01M 2/1653 521/134 |

OTHER PUBLICATIONS

Smook, Preparation of ultra-high strength polyethylene fibres by gel-spinning/hot-drawing at high spinning rates, 1983, Polymer Bulletin, 9.1-3, pp. 75-80.*
Kim, Rheological and entanglement characteristics of linear-chain polyethylene liquids in planar Couette and planar elongational flows, 2008, Journal of Non-Newtonian Fluid Mechanics ,152.1, pp. 168-183.*
Gel-spun high-performance polyethylene fibres, Mar. 13, 2013, pp. all; https://www.slideshare.net/sharifnejad/gel-spun-highperformance-polyethylene-bres.*
Mackley, High Modulus Polyethylene (HMP), Feb. 28, 2013, pp. all; https://www.slideshare.net/malcolmmackley/high-modulus-polyethylene-2013.*
Wikipedia, Couette Flow, 2012, https://web.archive.org/web/20120729070846/https://en.wikipedia.org/wiki/Couette_flow (Year: 2012).*
Wikipedia, Freezing, 2013, https://web.archive.org/web/20131108111056/https://en.wikipedia.org/wiki/Freezing (Year: 2013).*
Birley et al., The Extruder Characteristics, Physics of Plastics: Processing, Properties and Materials Engineering, Chapter 4, 1992 (Year: 1992).*
Lepri et al. Thermal conduction in classical low-dimensional lattices. Physics Reports. Apr. 2003 vol. 377(1). Elsevier.
Henry et al High thermal conductivity of single polyethylene chains using molecular dynamics simulations. Physical Review Letters. Dec. 5, 2008 vol. 101 American Physical Society.
Mergenthaler et al. Thermal conductivity in ultraoriented polyethylene. Macromolecules. 1992. pp. 3500-3502 vol. 25(13) American Chemical Society. Washington. DC.
Shen et al. Polyethylene nanofibres with very high thermal conductivities. Nature Nanotechnology 2010. pp 251-255, vol. 5. Macmillan Publishers Limited.
Smlth et al Ultra-high-strength polyethylene filaments by solution spinning/drawing Polymer. Nov. 1980 pp. 1341-1343. vol. 21(11). Elsevier.
Choy et al. Thermal conductivity of gel-spun polyethylene fibers. Polymer Physics Mar. 11, 2003, pp. 365-376 vol. 21(3) John Wiley & Sons, Inc.
Agari et al Thermal conductivity of polymer filled with carbon materials: Effect of conductive particle chains on thermal conductivity Journal of Applied Polymer Science. Mar. 9, 2003 pp. 2225-2235. vol. 30(5) John Wiley & Sons.
Li et al. Electrospinning of nanofibers: Reinventng the wheel? Advanced Materials. Jul. 19, 2004, pp. 1151-1170. vol. 16(14).
Feng et al. Well-aligned polyaniline/carbon-nanotube composite films grown by in-situ aniline polymerization. Carbon. 2003. pp. 1551-1557. vol. 41(8). Elsevier.
Chae et al. Making strong fibers Science Feb. 15, 2008. pp. 908-909. vol. 319 No. 5865. American Association for the Advancement of Science.
Cao et al. Polymer Nanowire Arrays With High Thermal Conductivity and Superhydrophobicity Fabricated by a Nano-Molding Technique. Heat Transfer Engineering. Oct. 4, 2012. pp. 131-139. vol. 24(2-3) Informa UK Limited.
Singh et al. High thermal conductivity of chain-oriented amorphous polythiophene. Nature Nanotechnology. 2014. pp. 384-390 vol. 9. Macmillan Publishers Limited.

(56) References Cited

OTHER PUBLICATIONS

Huang et al. A review on polymer nanofibers by electrospinning and their applications in nanocomposites. Composites Science and Technology. Nov. 2003. pp. 2223-2253. vol. 63(15) Elsevier.

Katta et al Continuous Electrospinning of Aligned Polymer Nanofibers onto a Wire Drum Collector. Nano Letters 2004 pp. 2215-2218 vol. 4(11). American Chemical Society. Washington, DC.

Sundaray et al. Electrospinning of continuous aligned polymer fibers. Applied Physics Letters. 2004. pp. 1222 vol. 84 AIP Publishing LLC.

Frenot et al. Polymer nanofibers assembled by electrospinning. Current Opinion in Colloid & Interface Science. Mar. 2003. pp. 64-75. vol. 8(1). Elsevier.

Li et al. Electrospinning Nanofibers as Uniaxially Aligned Arrays and Layer-by-Layer Stacked Films. Advanced Materials. 2004. pp. 361-366. vol. 16(4).

Kunugi et al. Preparation of ultra-high modulus polyethylene films by the zone-annealing method Polymer. 1988. pp. 814-820 vol. 29(5). Elsevier.

Langer et al. Thermal conductivity of stretched and annealed poly (p-phenylene sulfide) films Solid State Communications. 2003. pp. 353-357. vol. 126(6). Elsevier.

Smith et al. Single-Polymer Dynamics in Steady Shear Flow. Science. Mar. 12, 1999. pp. 1724-1727. vol. 283 No. 5408. American Association for the Advancement of Science.

Xie et al Viscosity reduction and disentanglement in ultrahigh molecular weight polyethylene melt: Effect of blending with polypropylene and poly(ethylene glycol). European Polymer Journal. Aug. 2007. pp. 3480-3487. vol. 43(8). Elsevier.

Rastogi et al. Heterogeneity in polymer melts from melting polymer crystals. Nature Materials. Jul. 24, 2005 pp. 635-641. 4. Macmillan Publishers Limited.

Smook et al Influence of draw ratio on morphological and structural changes in hot-drawing of UHMW polyethylene fibres as revealed by DSC Collid & Polymer Science. 1984. pp. 712-722. 262.

Tashiro et al Calculation of three-dimensional elastic constants of polymer crystals. 2. Application to orthorhombic polyethylene and poly(vinyl alcohol). Macromolecules. 1978. pp. 914-918. American Chemical Society. Wahshington. DC.

Gururajan et al Real-time crystalline orientation measurements during low-density polyethylene blown film extrusion using wide-angle X-ray diffraction. Polymer Engineering & Science. Jul. 2012. pp. 1532-1536. Society of Plastic Engineers. John Wiley & Sons.

Papkov et al. Simultaneously Strong and Tough Ultrafine Continuous Nanofibers. ACS Nano. 2013. pp. 3324-3331 vol. 7(4). American Chemical Society Washington, DC.

* cited by examiner

CONTINUOUS FABRICATION SYSTEM AND METHOD FOR HIGHLY ALIGNED POLYMER FILMS

This application claims priority to provisional application Ser. No. 61/989,588 filed on May 7, 2014, the contents of which are incorporated herein by reference.

This invention was made with government support under Grant No. DE-EE0005756 awarded by the Department of Energy. The government has certain rights in the invention.

BACKGROUND OF THE INVENTION

This invention relates to the making of highly aligned polymer films having superior mechanical and thermal properties through a drawing-induced plastic deformation.

More efficient utilization of energy resources requires development of new materials with superior properties, such as mechanical strength or thermal conductivity. For example, bulk polymers usually have low thermal conductivities (~0.2 $W \cdot m^{-1}K^{-1}$) as compared to metals (~40 $W \cdot m^{-1}K^{-1}$ steel, ~400 $W \cdot m^{-1}K^{-1}$ copper). This low thermal conductivity has hindered widespread deployment of polymers in heat transfer applications. As it has beets shown that aligned molecular chains behave like one-dimensional conductors,[1] superior thermal and mechanical properties can be achieved through alignment of polymer charm (and filler materials in polymer-based composites).[2-9] Due to ability to spin small diameters (5 to 15 µm), which helps to maximize orientation and minimize defects, fibers have emerged as the natural form factor for producing bulk quantities of highly aligned polymeric materials. These fibers can have elastic moduli near the theoretical limit for perfectly aligned crystalline polymer.[10] A number of high performance commercially available polyethylene fibers (such as Spectra or Dyneema fiber) have successfully capitalized on processing and synthesis innovations made over the past few decades.[11] Fabrication of these high performance fibers typically use a gel spinning technique in which a concentrated polymer gel is first extruded through a small orifice, then simultaneously mechanically drawn and solvent removed—producing highly crystalized, oriented, and strong continuous fibers.[5, 10, 12] As opposed to mechanical drawing, Cao et al., used a nano-template to achieve aligned ultra-high molecular weight polyethylene (UHMWPE) nanowires.[13] In another approach, Singh et al., fabricated amorphous aligned polythiophene nanofibers during electro-polymerization in nano-templates.[14] Other approaches, such as electrospinning, can be used to fabricate large-scale amounts of polymer fibers.[15-17] As opposed to gel spinning, however, electrospinning does not lead to highly aligned molecular chains.[18]

While fibers are ideal for textiles, however, for practical applications, such as fins in heat exchangers, casings for electronic systems, and biomedical treatments like improved cooling pads for stroke patients, a film form of these materials is essential. The difficulty lies in translating the remarkable material property enhancements seen in high performance fibers into a film form factor. Furthermore, for widespread commercial implementation of these advanced materials, a scalable, continuous, and robust film manufacturing platform is essential. Zone annealing, electrospinning, and melting/drawing are used to fabricate aligned polymer films.[19-21] In zone annealing, single crystal mat is locally heated and subjected to tension resulting in an aligned film. Using this method, Kunugi et al., achieved a dynamic modulus of ~220 GPa at a draw ratio ($\lambda$) of ~175x.[20] Zone annealing, however, requires a single crystal mat as the starting material. In comparison, films have been made from polycrystalline polymer by using multi-layer arrays of electrospun nanofibers, but maximum film size appears limited.[19] Melting and drawing was used by Langer et al., to produce aligned polymer films.[21] In this method, films were fabricated by melting polymer powder between heated quartz plates, then mechanically drawn ($\lambda$=1.5x) and annealed. Measured thermal conductivity of these poly (p-phenylene sulfide) films was ~3 $W \cdot m^{-1}K^{-1}$ at 200 K. The authors suggested that extrapolating measured thermal conductivity values to room temperature, improvements of approximately two orders of magnitude are possible. As compared to fiber production, this is a low draw ratio as well as a non-continuous process. Also in contrast to electrospinning, zone annealing and melt/drawing are batch scale processes—making them unlikely to be implemented in commercial facilities. At the same time, electrospinning suffers from low molecular chain alignment in the final product.

SUMMARY OF THE INVENTION

The process for continuous fabrication of highly aligned polymer films according to the invention includes subjecting a polymer-solvent solution to a high shear, high temperature, Couette flow to extrude a thin film having polymer chain disentanglement. The extruded thin film is frozen and the solvent is removed through one or more of the following methods; pressing, evaporation or heating of the polymer gel to form a dried film. The dried film is mechanically drawn using a constant-force, adaptive-thickness drawing system to align polymer molecular chains through plastic deformation. A suitable polymer is ultra-high molecular weight polyethylene.

In a preferred embodiment, the freezing step uses a $N_2$-cooled substrate. An alternative form of freezing the polymer entails passing the hot extruded material through a pair of liquid nitrogen-cooled rollers thus simultaneously freezing the gel as well as forming into a desired thickness. It is also preferred that the high shear flow is greater than 1,000 $s^{-1}$. The mechanical drawing step may be performed within a heated enclosure.

In another preferred embodiment, the mechanical drawing step is performed on a continuous drawing system having dual feed spools and a heated enclosure housing dual sets of draw rollers. The constant-force, adaptive-thickness system may include pneumatic cylinders to provide film clamping. It is also preferred that the extrusion and drawing systems are mated together with an automated conveyor belt system.

DESCRIPTION OF THE PREFERRED EMBODIMENT

In this patent application we demonstrate a continuous fabrication platform for HAPFs based on a sol-gel extrusion and mechanical drawing process. This platform provides ability for scalable fabrication of uniform large area films and is characterized for fabrication of highly aligned UHMWPE films>15 m in length. After solution preparation, the process is comprised of sol-gel extrusion, structure freezing and drying, and mechanical drawing. This new design provides the opportunity for deployment of HAPFs; for example, in heat transfer applications, such as electronic packaging and heat exchangers, with the additional advantages of energy savings, weight reduction, chemical resistance, electrical insulation, and lower cost as compared to metals.

Figure 1:
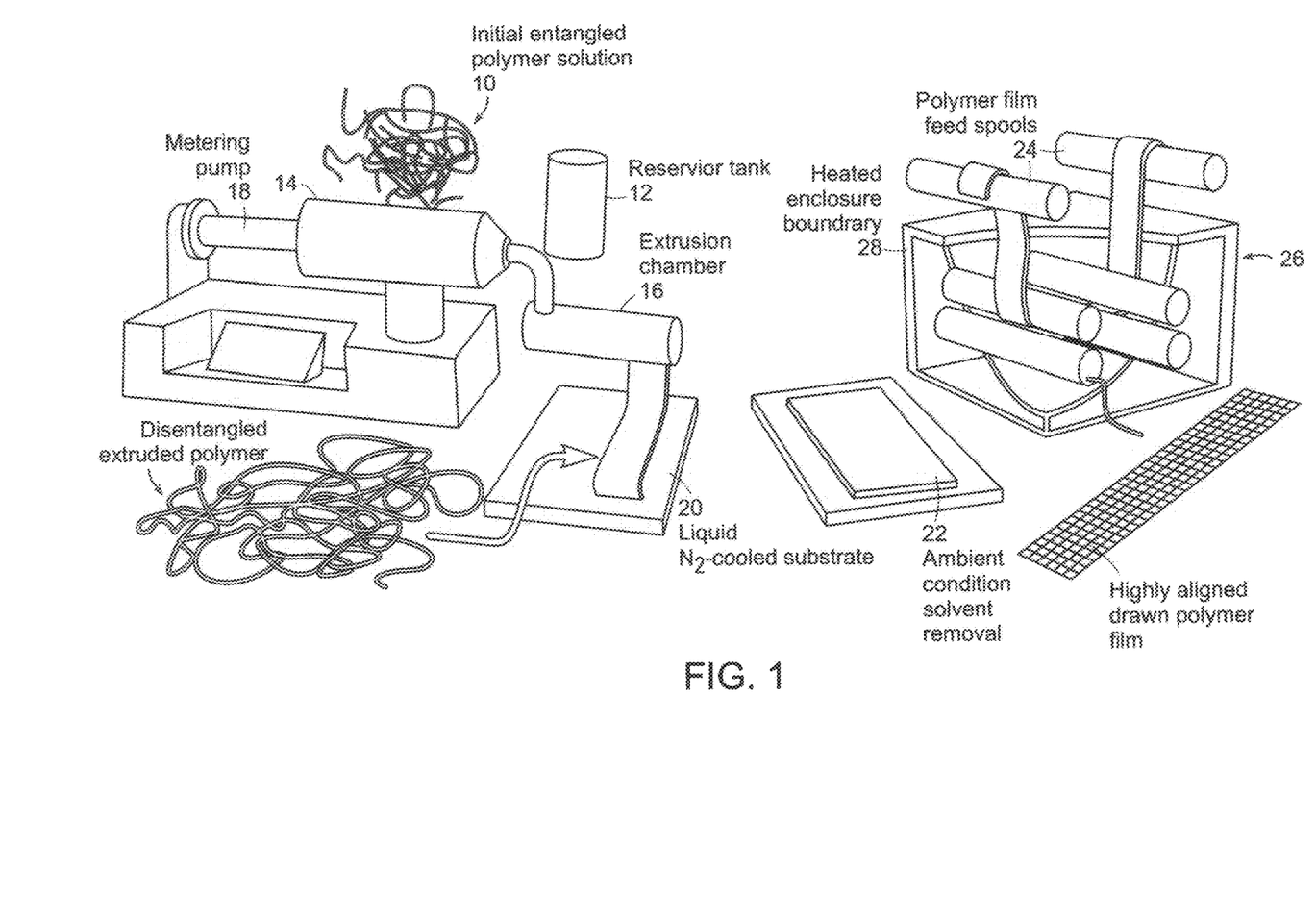
FIG. 1 is a schematic, perspective view of an embodiment of the continuous fabrication platform disclosed herein.

FIG. 1 shows a schematic of the platform and corresponding structure of the polymeric molecular chains. As prepared polymer solution 10 is loaded into a reservoir 12, then transferred into a syringe 14 through a three-way valve. The solution is extruded through an extrusion chamber 16 using a metering pump 18. The extrusion chamber 16 utilizes Couette flow to impart a high, uniform shear rate to the polymer solution 10 as it passes through the chamber 16. This flow configuration is designed to disentangle the molecular chains within the solution. The extruded solution exits the chamber onto a liquid $N_2$-cooled substrate 20, rapidly freezing the disentangled structure in place. The frozen gel is comprised of both polymer and solvent. Next, the majority of solvent is removed from foe gel through evaporation at ambient conditions, resulting in a mechanically stable and flexible thin film 22. This thin film 22 is collected onto a feed spool 24 and loaded into a mechanical drawing system 26. This system 26 consists of dual roller sets contained within a heated enclosure 28 that features constant-force adaptive-thickness capability. As the polymer film 22 is processed by the drawing station, the disentangled molecular chains are aligned through plastic deformation. An additional spool located outside the heated region allows for recovery and storage of the drawn film. This system is automated, enabling ability to adjust process variables to tune final HAPF properties.

Figure 2A:
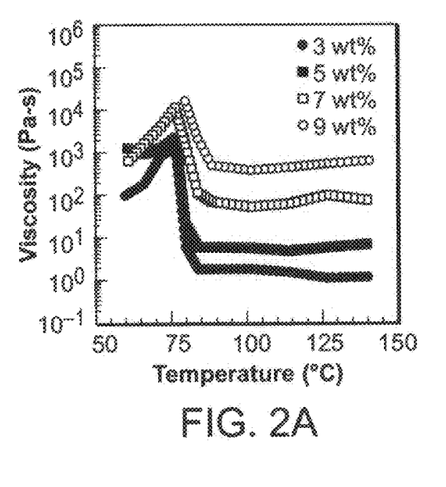
FIG. 2a is a graph of viscosity versus temperature providing gelation temperature for the polymer solution as a function of polymer concentration.

To assess polymer-solvent solution fluid dynamics and determine extrusion parameters, rheological characteristics of the as prepared polymer solution were examined. For these rheological experiments, an AR-G2 rheometer (TA Instruments) with concentric cylinder configuration was utilized. UHMWPE solutions were loaded at 150° C., and temperature sweep and shear rate sweep measurements performed on several different polymer concentrations. Temperature sweep measurements provide the gelation temperature range (above which the solution can be processed), and shear rate sweep experiments indicate the onset shear rate for molecular chain disentanglement (giving minimum shear rate to employ during extrusion). FIG. 2a shows viscosity curves for temperature sweep measurements at various UHMWPE concentrations. For these experiments a temperature range of 50-140° C., cooling rate of 3° C./min, and a constant shear rate of 0.1 $s^{-1}$ were utilized. While at high temperatures (>90° C.), polymer viscosity is relatively low, a sharp increase was noted at temperatures around 80-90° C. This region represents a gelation temperature, below which the formation of physical networks within the polymer mixtures results in polymer gelation and steep increase in viscosity. Gelation temperature was noted to be directly proportional to UHMWPE concentration. As polymer concentration increases, more molecular chains present in the solution lead to an earlier onset of a physical network formation during cooling. Based on these results, a temperature of 120° C. was chosen for sample extrusion to maintain a large margin of safety above the gelation point.

Figure 2B:
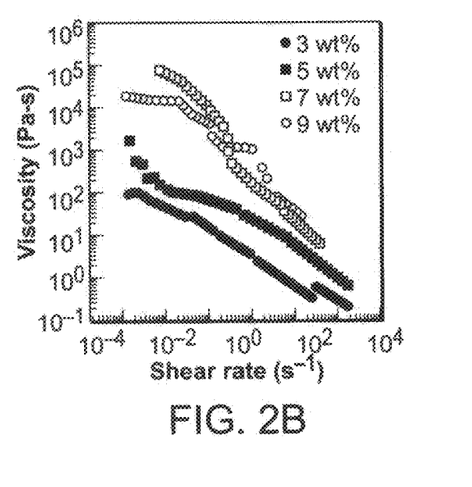
FIG. 2b is a graph of viscosity versus shear rate providing the required shear rate for polymer chain disentanglement.

FIG. 2b shows the viscosity curves of shear rate sweep experiments (0.001 to 1,000 $s^{-1}$) for different UHMWPE concentrations at 120° C. This temperature was chosen because it is greater than the gelation temperature regardless of UHMWPE concentration. Viscosity of UHMWPE mixtures shows onset of shear thinning for all samples at a strain rate of 0.1 $s^{-1}$. Such a shear thinning effect was more pronounced for solutions with higher UHMWPE concentration, due to disentanglement and orientation of molecular chains. As molecular chains become increasingly disentangled and oriented along the shear direction, the viscosity value should approach a lower horizontal asymptote. Even at an experimental shear rate of 1,000 $s^{-1}$, however, viscosity is still decreasing as shown in FIG. 2b. This continuing decrease presents an important extrusion system design parameter and suggests that to achieve a high degree of molecular chain disentanglement, shear rates in excess of 1,000 $s^{-1}$ are desired. Since simple shear flow is a combination of stretching and rotation flows, no matter how large the magnitude of shear rate, even for a single molecular chain in solution, Couette flow alone is insufficient to fully stretch the polymer chain from the initial coiled state.[22] Thus, an additional longitudinal shear (drawing step) is essential for obtaining highly aligned films. As follow-on mechanical drawing merely shifts existing entanglements opposed to removing them, however, a highly disentangled feedstock is critical.

Figure 2C:
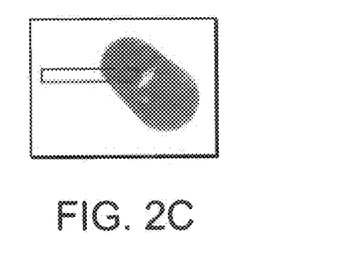
FIG. 2c is a perspective view of an embodiment of an extrusion chamber design based on Couette flow.
Figure 2D:
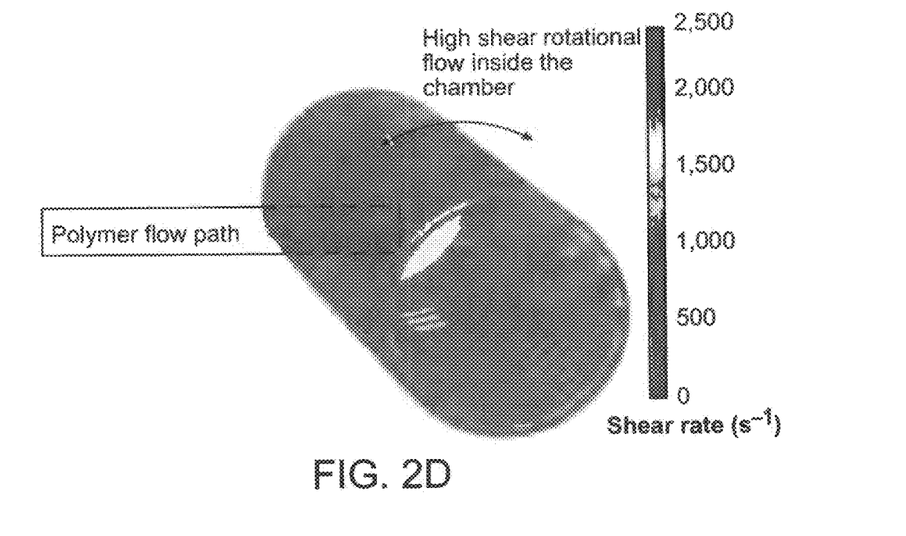
FIG. 2d shows the imposed shear rate on the polymer solution.
Figure 2E:
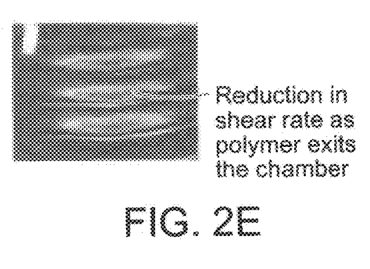
FIG. 2e illustrates reduction in shear rate as polymer exits the extrusion chamber.
Figure 3A:
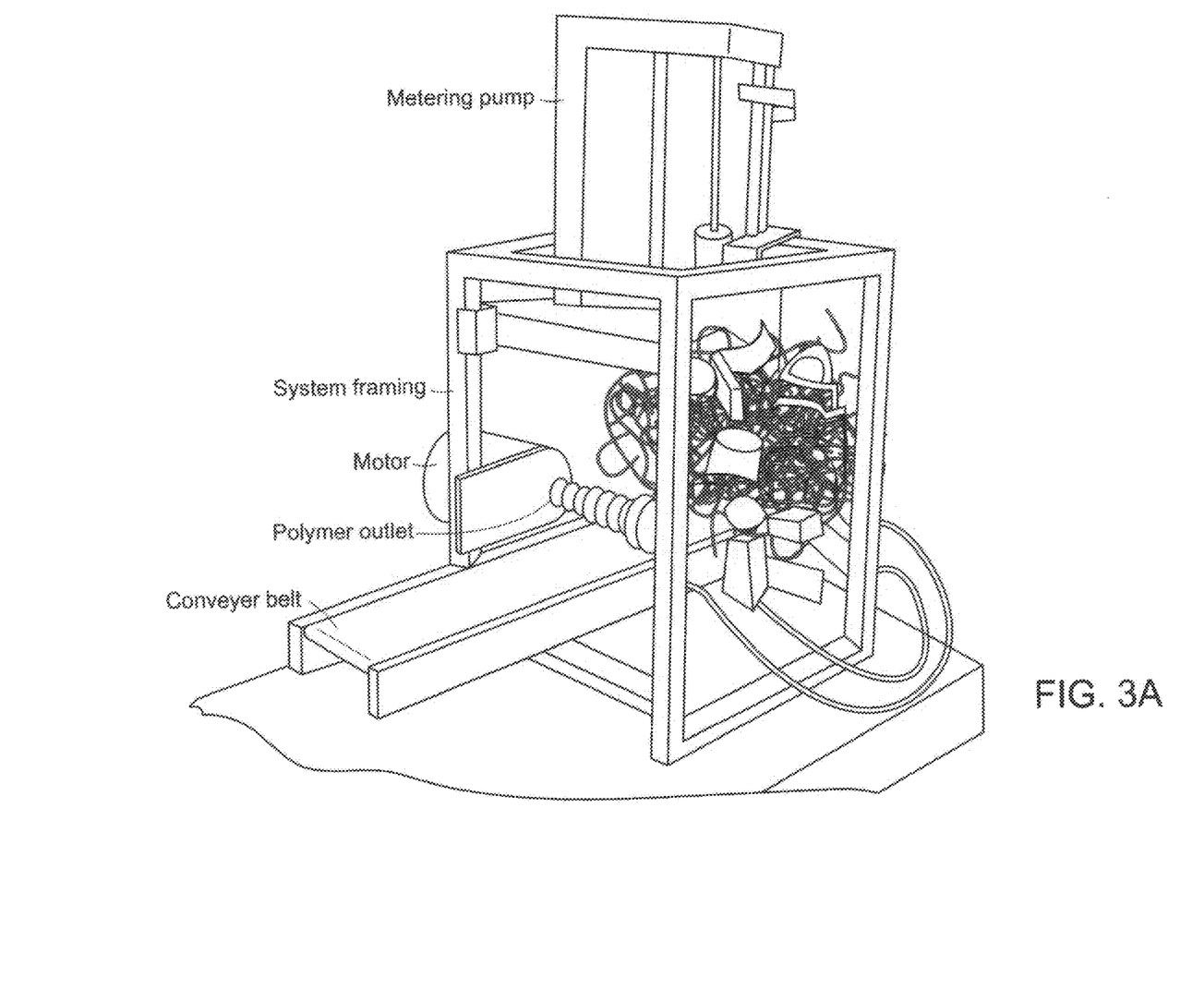
FIG. 3a is a perspective view of an embodiment of the extrusion system disclosed herein.
Figure 3B:
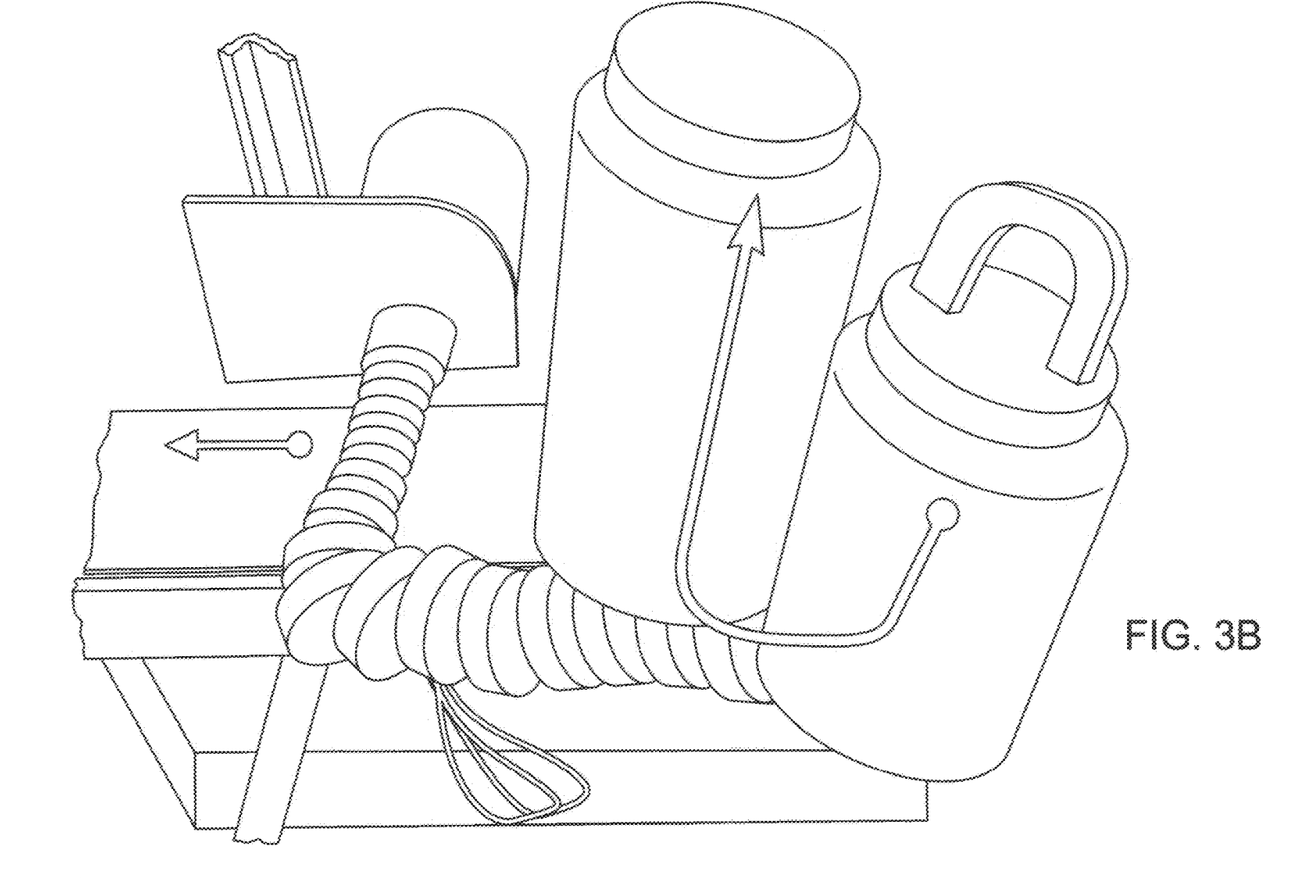
FIG. 3b is a perspective view of major system components and refill/extrusion polymer flow path.

To maximize shear rate on the polymer solution during extrusion, Couette flow-based extrusion chamber 16 shown in FIG. 2c was utilized. FIG. 2d shows simulated shear rate distribution in the solution as the solution passes through the chamber (details provided below). The uniform shear rate of ~2,000 $s^{-1}$ inside the extrusion chamber 16 surpasses that targeted value of 1,000 $s^{-1}$ (experimentally identified from shear measurements previously described) by a factor of two. Furthermore, values obtained from COMSOL simulations are consistent with shear rate calculated from the analytical formula $\dot{\gamma}=2\pi\omega_e r_1/60h$, where $\omega_e$ is rotational velocity, $r_1$ is inner cylinder radius, and h is gap size. COMSOL modeling played a vital role in realized rheological characteristics of polymer solution in the extrusion process and aided design by simulating shear rate for different chamber configurations (i.e., gap sizes between rotating inner cylinder and fixed outer cylinder, as well as inlet and outlet geometry). For example, from the COMSOL simulations we noticed that as the polymer solution exits the chamber tangential to the direction of flow, there is a steep decrease in shear rate, to ~400 s$^{-1}$, FIG. 2(e). It is possible that loss of molecular chain disentanglement can occur in this region. While this effect cannot be eliminated, design steps were taken to minimize both this shear rate reduction region as well as time between polymer exiting the extrusion chamber 16 and making contact with the liquid $N_2$-cooled substrate 20. The original extrusion chamber design called for a long cylindrical outlet featuring a Poiseuille flow configuration, which was subsequently dropped in favor of rectangular outlet tangential to the direction of flow. FIGS. 3a and b show the deployed extrusion system and details of the polymer solution flow path, respectively.

Figure 4A:
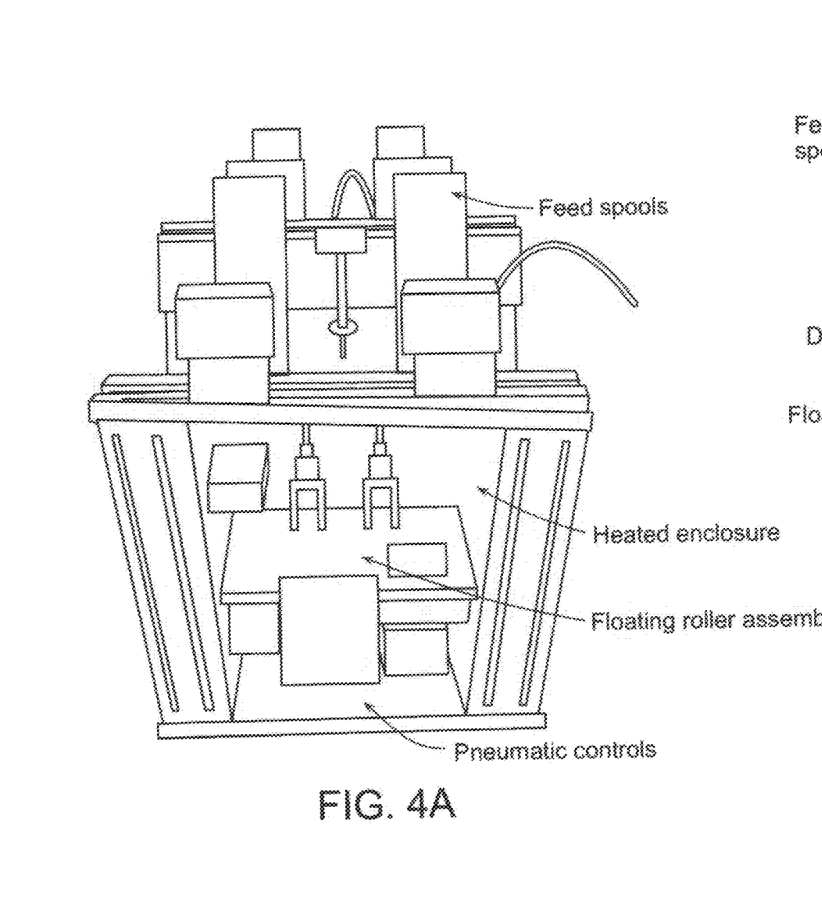
FIG. 4a is a perspective view of an embodiment of the drawing system disclosed herein.
Figure 4B:
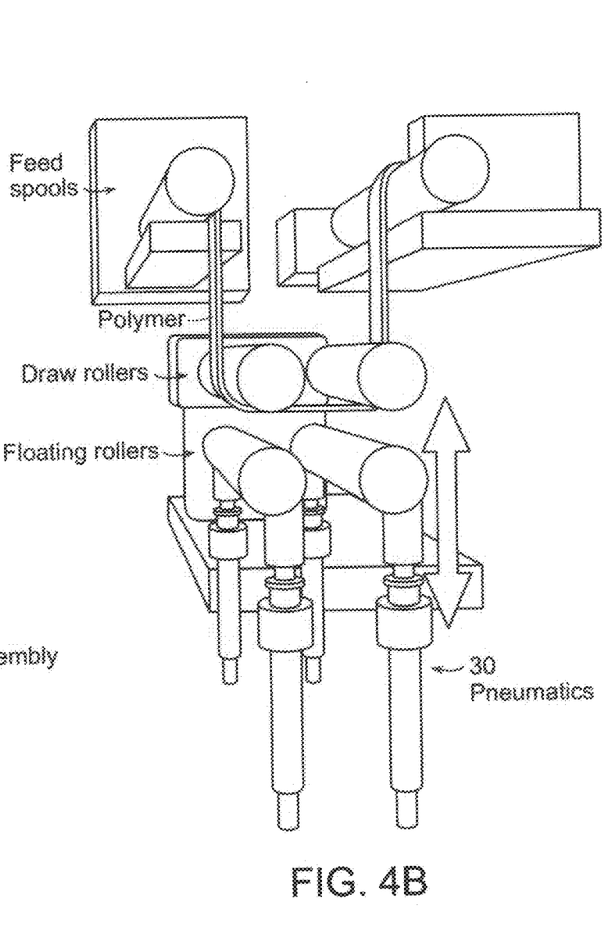
FIG. 4b is a perspective view of internal roller layout in an embodiment of the invention.
Figure 4C:
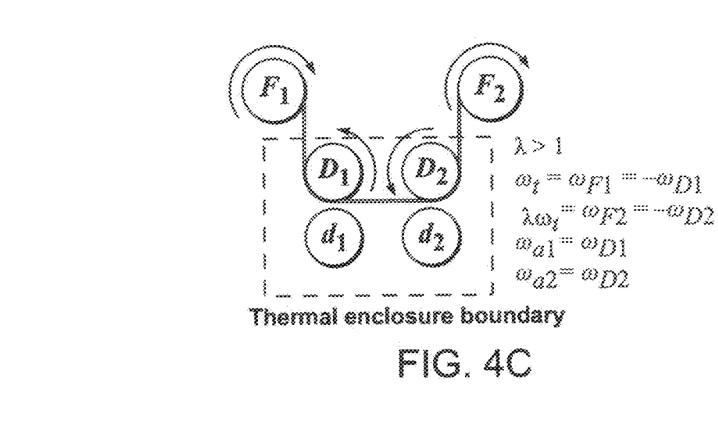
FIG. 4c illustrates sample rotational velocity relationships between different rollers.
Figure 4D:
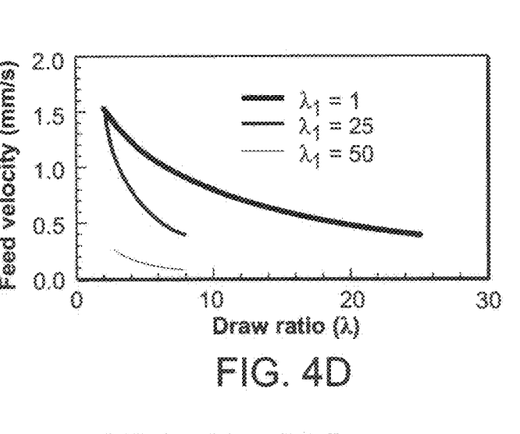
FIG. 4d is a graph of feed velocity against draw ratio showing dependence of the polymer film input speed on the cumulative draw ratio.

Following extrusion, continuous uniaxial drawing at elevated temperatures helps to further orient molecular chains along the direction of draw in the UHMWPE films. This serves to drastically anisotropically alter material properties in the direction of drawing. To this effect, we designed and fabricated a continuous drawing system as shown in FIGS. 4a and 4b consisting of dual feed spools and heated enclosure housing dual sets of draw rollers (maintained at ~90° C.). The pneumatic cylinders 30 provide constant-force adaptive-thickness clamping for the film, with FIGS. 4c and d providing rotational velocity relationships used to obtain controlled draw ratios. As film width and thickness are inversely proportional to the draw ratio, the ability to automatically adjust for dimensional changes is useful. This feature of the drawing platform is unique and is utilized to fabricate high-quality HAPFs. Based on our system design, input films on the order of 175 mm were typically used, but these dimensions can be easily scaled up for industrial purposes. At draw ratios of 100×, use of 175 mm initial lengths enables fabrication of continuous HAPFs>15 m long. We emphasize that fabrication of high quality films on these length scales is achieved through the innovative constant-force adaptive-thickness drawing design.

Figure 5A:
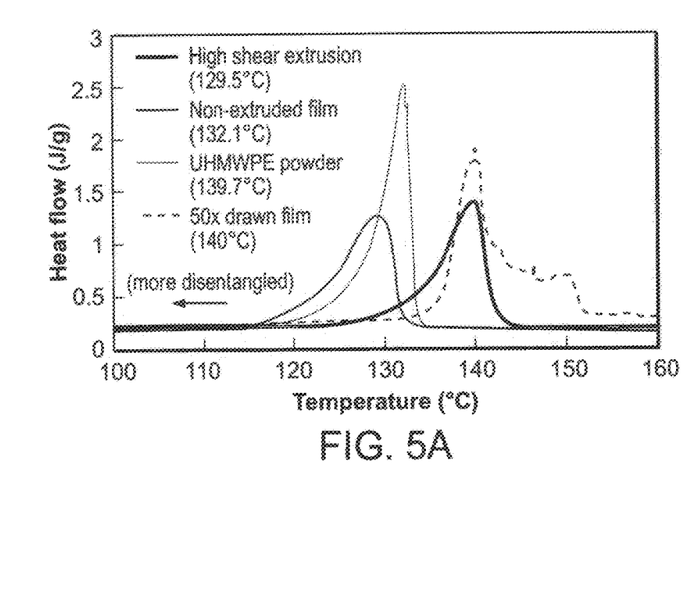
FIG. 5a is a graph of heat flow against temperature showing DSC results and corresponding melting temperature of various polymer samples.

Following platform development, effects of molecular chain disentanglement and alignment were qualitatively evaluated on fabricated UHMWPE films. Characterization tools include differential scanning calorimetry (DSC) to give insight into effectiveness of Couette flow-induced disentanglement; X-ray diffraction (XRD) to assess crystallization and structure alignment as a function of draw ratio; scanning electron microscopy (SEM); Fourier transform infrared (FTIR) spectroscopy to analyze orientation; and atomic force microscopy (AFM) to monitor changes in surface morphology during processing. FIG. 5a displays a sequence of DSC curves (Discovery DSC, TA Instruments) for the initial UHMWPE powder, non-extruded film (not subjected to shear), extruded film subjected to high shear rate (2,000 s$^{-1}$), and high shear extruded film drawn to 50×. The key parameter obtained from DSC measurements is melting temperature. Melting temperature decreased from a maximum of 139.7° C. in the initial semi-crystalline UHMWPE powder to a low of 129.5° C. in the extruded film. A decrease in melting temperature indicates less entanglements in the polymer microstructure.[23, 24] This suggests destruction of the original lamellar structure in the semi-crystalline powder. While both extruded and non-extruded films displayed melting temperatures less than the initial powder, the high shear rate extrusion leads to greater disentanglement in the polymer-solvent solution. These results verify that while commonly used gel spinning processes (similar to the non-extruded sample) provide some degree of inherent disentanglement, the additional induced high shear rate extrusion in this work further enhances molecular chain disentanglement. Further evidence of initial chain disentanglement is provided by XRD comparisons between extruded and non-extruded films, with the extruded film showing a much larger amorphous region resulting form the higher degree of chain disentanglement. DSC analysis of the highly drawn UHMWPE film shows several peaks at the melting. The first peak, occurring at 140° C., corresponds to the orthorhombic structure melting temperature of the now highly crystalized polymer. The other peaks, as suggested by Smook et al., likely result from solid-state phase transition of a portion of the orthorhombic structure into other crystalline structures before finally melting.[25] This sort of transitional behavior, however, was only observed by Smook et al. only for samples under tension during DSC. Conversely, for DSC experiments conducted in this work, samples were not constrained.

Figure 5B:
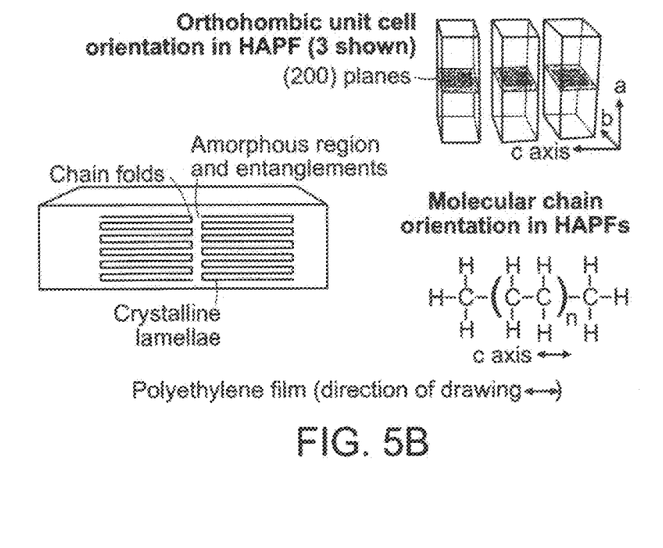
FIG. 5b is a schematic illustration showing details of orientation effects on the orthorhombic crystal structure and molecular chains resulting from mechanical drawing.
Figure 5C:
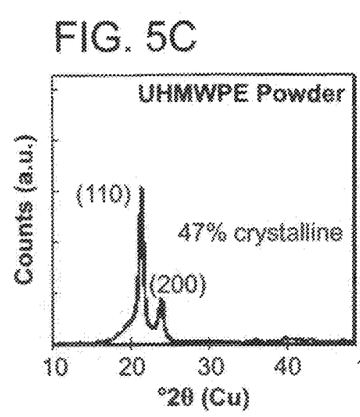
FIGS. 5c, 5d, 5e, and 5f show x-ray defection patterns of various materials such as UHMWPE powder, dried extruded undrawn film, UHMWPE film at 50× and UHMWPE film at 100×.
Figure 5D:
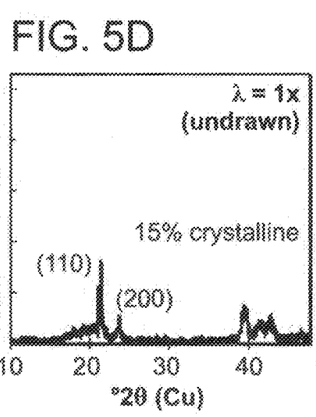
Figure 5E:
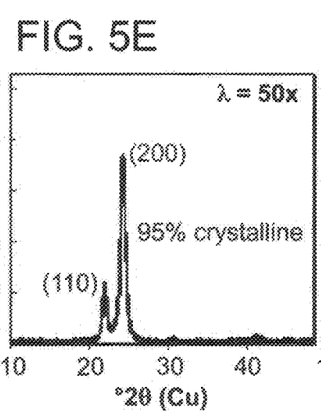
Figure 5F:
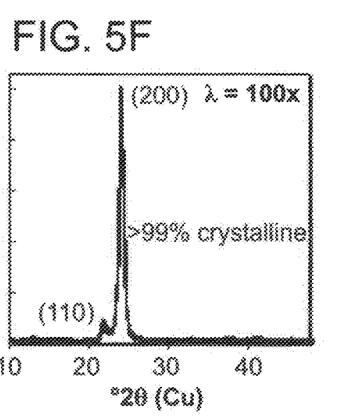

In conjunction with evaluating disentanglement crystallographic structure of the mechanical drawn UHMWPE films was examined using XRD (PANlytical X'Pert Pro, conventional 1.8 kW source with a Cu target). Crystalized polyethylene is comprised of an orthorhombic unit cell with dimensions of 7.41 Å by 4.94 Å by 2.55 Å.[26] In XRD of the crystalized polyethylene, two peaks are of interest, those associated with the (110) and (200) planes.[26, 27] As polyethylene is drawn and crystallizes, the molecular chains align along the unit cell's c axis as shown in FIG. 5b. During mechanical drawing, plastic deformation of the bulk polymer results in destruction of the original crystallite morphology and reordering to form new crystallites, which are then themselves destroyed, ultimately ending in a fibrillar morphology at high draw ratios.[10] FIGS. 5c-5f show results of XRD analysis for the initial powder, as extruded film, 50×, and 100× drawn UHMWPE film. Using HighScore Plus software, percentage of crystallinity each figure is determined by comparison of the area between the amorphous hump and crystalline peaks. During plastic deformation, sliding occurs in the block-like lamella substructure of the polymer.[28] Interestingly, crystallinity of the UHMWPE was found to decrease between the initial powder (47%) and the extruded dried film (15%). This decrease indicates that polymer disentanglement resulting from the high shear rate Couette flow extrusion process destroys the initial crystalline structure of the powder, consistent with the DSC data. Crystallinity, however, is quickly reintroduced into the films as a result of mechanical drawing. FIG. 5f shows that at a draw ratio of 100×, crystallinity has reached >99%. In additional to the decrease in crystallinity, we expected to see some degree of chain orientation in the extruded films, however, none was detected. Furthermore, previous XRD evaluation between extruded and non-extruded films demonstrates lack of orientation in the extruded sample by maintaining relative (110) to (200) plane peak intensities.

Additionally, we evaluated unit cell distortion as a function of draw ratio in our UHMWPE. As demonstrated by these results, there was no discernable change in unit cell dimensions, indicating that rather than introducing strain in the unit cell, mechanical deformation preferentially crystalizes the amorphous phase into an orthorhombic configuration. As draw ratios increase, existing molecular chain entanglements and chain ends become increasingly concentrated in the remaining noncrystalline regions.[10] Another noteworthy feature that emerged from XRD analysis is the reversal in relationship of (110) and (200) peak intensities during processing. Peak intensity is a measure of the cumulative X-ray diffraction from the corresponding planes. As FIG. 5c shows, bulk unoriented UHMWPE powder, the ratio of intensities is approximately 1 to 0.3. Although crystallinity decreases as a result of the sol-gel processing and extrusion. FIG. 5d, the ratio remains approximately the same. During mechanical drawing, however, the ratio between peak intensities was found to change dramatically. This interesting relationship has been previously reported.[25] As the films are drawn, molecular chains align parallel to the c unit cell axis and (200) plane (FIG. 5b). This induced orientation results in an increased measured diffraction intensity from the (200) plane, while the population of X-rays diffracted from the (110) plane in the detector direction are decreased. Hence, as draw ratio increases, the intensity ratio between the peaks favors the (200) plane (FIGS. 5e and 5f). Further confirmation of this orientation-induced effect was achieved by measuring 90° in-plane sample rotation within the XRD instrument, resulting in an identical XRD pattern. These results suggest that perfectly oriented samples will feature a single intense (200) peak.

Figure 5G:
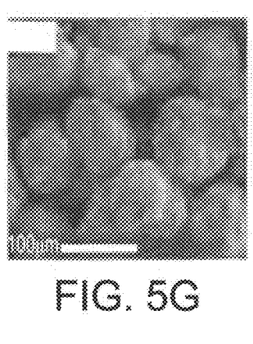
FIGS. 5g, 5h, 5i, and 5j are scanning electron microscope micrographs showing the surface morphology of the materials shown in FIGS. 5c-5f.
Figure 5H:
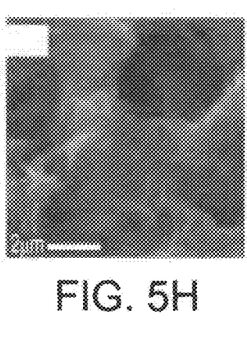
Figure 5I:
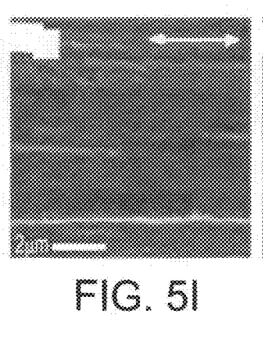
Figure 5J:
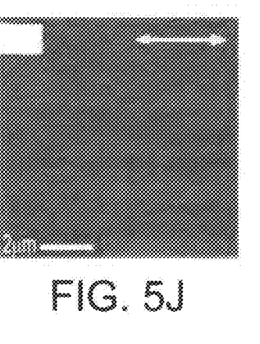

FIGS. 5g through 5j show SEM images (JEOL 6010LA) used to determine differences in surface morphology between the raw UHMWPE polyethylene source material and dried extruded film. As the images show, the initial particulate material resembled tightly wound balls of string. Comparing this to the extruded sample, however, disentanglement of the polymer as a result of the high shear rate Couette-based extrusion process is evident. This disentanglement has twofold effects: (1) allows for plastic deformation to high draw ratios without film rupture, and (2) helps in subsequent molecular chain alignment for improved material properties. SEM images of 50× and 100× drawn UHMWPE films. FIGS. 5g and 5j show mechanical drawing-induced orientation effects in the films. As shown, film structure is uniform fiberous with minimal defects. Additional SEM and corresponding AFM scans provide further validation of morphological changes in the highly aligned, defect free films. We emphasize that these high quality films are achieved through the innovative automated combination of Couette flow extrusion, liquid $N_2$ cooling, and constant-force adaptive-thickness mechanical drawing.

METHODS

Polymer Solution Preparation

UHMWPE (Alfa Aesar, 3-6×10⁶ g/mole) in powder form is added to an organic solvent (Decalin, Alfa Aesar) and uniformly heated to 150° C. in a silicon oil bath. The solution has a 3 wt % UHMWPE concentration. Antioxidant (2,6-Di-tert-butyl-4-methylphenol) with concentration of 0.5 wt % to UHMWPE is added to prevent oxidation during dissolution. A magnetic stir bar provides agitation, and the mixture is stirred at 150° C. for ~24 hours ensuring complete dissolution. Typical batch size in our system is 200 mL, limited only by reservoir volume; thus, solution preparation is independent of the platform. In this manner, multiple polymer solutions can be prepared in parallel and then extruded in series to support continuous fabrication.

Extrusion System Modeling

Fluid dynamics inside the extrusion chamber were modeled using COMSOL multiphysics software. This model simulates a non-Newtonian fluid for a viscosity that spans several orders of magnitude. Note that since viscosity of this solution is a function of shear rate, to accurately assess dynamics and disentanglement of UHMWPE solutions in the extrusion process, experimentally measured rheological data was incorporated in the computation model. Polymer solution flow rate through the system is 1,500 mL/h.

Extrusion System Design

The extrusion system is approximately 60 cm wide, 30 cm deep, and 65 cm tall, consisting of a metering pump, reservoir tank, Couette flow extrusion chamber, and conveyor belt assembly. This system features four independently controlled temperature zones—reservoir tank, valves and plumbing, syringe, and extrusion chamber. In general, the fill tank, metering pump, and valves are maintained at 150° C. to prevent polymer gelation and subsequent system clogging. The extrusion chamber, however, is set at 120° C. to enhance extruded gel mechanical stability. For system operation, a three-way valve ports the metering pump to either the reservoir or the extrusion chamber for refilling or extruding, respectively. Our flow rate of 1,500 mL/h yields UHMWPE film production rate of 7.5 m/h (based on 2 cm width strips). By moving the substrate in a raster pattern, films wider than the extrusion chamber outlet can be fabricated. Likewise, layering extrusion passes cans be employed to produce thicker films.

Liquid $N_2$ Freezing and Gel Drying

UHMWPE gel films are extruded onto borosilicate glass plates (6 mm thickness). These Plates were chosen for use due to thermal shock resistance and ease at which UHMWPE films can be removed after drying. Prior to extrusion, the glass plates are cleaned and submerged in a liquid $N_2$ bath (−196° C.) for a minimum of three minutes. When ready to be used in the extrusion system, the plates are removed from the $N_2$ bath and placed directly on the conveyor belt to receive UHMWPE gel films. When the hot (120° C.) UHMWPE solution exits the extrusion chamber and makes contact with the cold plate, the solution rapidly forms a gel maintaining the disentangled structure. Post-extrusion, the majority of solvent is evaporated from the films at ambient conditions over ~24 hours. Dried stable films are removed from the substrate and collected onto the drawing platform feed spool.

Mechanical Drawing

The drawing system has a compact footprint of 30 cm wide, 25 cm deep, and 35 cm tall, similar to a typical inkjet printer. Various automated access panels allow for film loading and general maintenance. Four stepper motors (Lin Engineering, Silverpak 17C, 0.6 Nm torque each) provide precise independent control over torque, rotational velocity, acceleration, and direction control for each roller set and feed spool. The drawing roller sets are spaced 40 mm apart on center, and each pair consists of drive roller and free spinning roller. A set of pneumatic cylinders (two per floating roller) engages the free roller against the drive roller to clamp the film during mechanical drawing and prevent slippage. Each cylinder is capable of 0-1,700 kPa input corresponding to an adjustable force of 0-170 N. Air pressure (and therefore clamping force) is controlled via a precision regulator supplied from a high pressure gas source (air or $N_2$). Based on two pneumatic cylinders per roller set, this corresponds to 0-3.4 N/mm clamping force along the strip. Draw ratios ($\lambda$) are achieved by rotating each set at a different rotational velocity ($\omega$) in order to mechanically draw film suspended between the rollers. Due to substantial increases in film length during drawing, automated feed spools located outside the heated enclosure are required to both supply the initial film as well as receive and store drawn film. The recovery roller plays a critical role in maintaining tension on the drawn film to allow for time-dependent stress decay.[28] In this setup, the left feed spool ($F_1$) and left draw roller set ($D_1$, $d_1$) always rotate at the same speed, as do the right feed spool ($F_2$) and right draw roller set ($D_2$, $d_2$). Since the drawing rollers and feed spools are symmetric, films can be drawn 'left to right' (feeding film from spool $F_1$ and recovering on spool $F_2$), or from right to left (feeding film from spool $F_2$ and recovering on spool $F_1$). It was found that for UHMWPE films, with ~100 μm initial thicknesses, the maximum achievable single pass draw ratio was 25×. Thus, for higher draw ratios, multiple passes through the drawing platform are required. For example, to fabricate UHMWPE films at 100×, we used a 25×, 2×, 2× recipe (for a total λ of 100×).

Automation

Due to the large number of process variables utilized throughout both extrusion and mechanical drawing, to achieve uniform films with consistent properties we developed custom LabVIEW programs for both processes. For the extrusion system, the automated interface allows for independent temperature control in each region, shear rate adjustment (through control of inner cylinder rotational speed and metering pump flow rate), and thickness of extruded sample (through adjustment of conveyor belt speed). For the mechanical drawing system, the automated interface enables the user to set up multi-pass 'recipes' dictating such parameters as draw ratio, number of passes, rotational velocity, torque, and acceleration. We found that the quality, and therefore material properties, of the final fabricated films was highly consistent using this automated approach.

Due to a variety of enhanced material properties as compared to their unaligned bulk counterparts, HAPFs present numerous commercial opportunities. While commercial-grade production systems for highly aligned polymers fibers are already in use (and address an existing mature commercial market), new opportunities for highly aligned polymers in a film form factor must be addressed. Current state-of-the-art fabrication techniques for molecular chain alignment in such films, however, are limited to small batch sizes, are manually intensive, and not easily scalable. Here we have reported a platform design for continuous fabrication of HAPFs and demonstrated production with UHMWPE. This design is based on a three-step procedure, (1) high shear rate Couette flow gel extrusion, (2) liquid $N_2$-based structure freezing and drying, and (3) a constant-force adaptive-thickness mechanical drawing process. Utilization of Couette flow produces a high degree of molecular chain disentanglement; liquid $N_2$ cooling freezes the disentangled structure in the extruded polymer gel; and the constant-force mechanical drawing leads to highly crystalline and uniform aligned final films. The platform was demonstrated using UHMWPE, producing HAPFs with crystallinity>99% and lengths exceeding 15 m. In addition to crystallinity, we are working on characterizing material property changes in HAPFs as a function of draw ratio to optimize the many process variable. To this effect, we have increased thermal conductivity in UHMWPE films from the bulk value of ~0.35 W $m^{-1}K^{-1}$ to greater than 20 W $m^{-1}K^{-1}$, and on par with stainless steel (~16 W $m^{-1}K^{-1}$) and titanium (~22 W $m^{-1}K^{-1}$). Thermal conductivity measurements were conducted on a custom designed system based on the Angstrom method to measure in-plane thermal conductivity. A detailed study of structural and material property changes as a function of draw ratio will be addressed in future work. We should also point out, however, not all properties are enhanced with increasing crystallinity. For example, while increased draw ratio (and increased crystallinity) results in improved thermal conductivity and elastic moduli (in the direction parallel to the drawing direction), properties such toughness are reduced.[29] Likewise, thermal conductivity perpendicular to the direction of drawing was found to maintain the initial bulk value with increasing crystallinity, strength in this orientation decreased.

In terms of processing time, HAPF production described in this paper takes ~26 h from polymer extrusion to HAPF in final form factor (~1 h extrusion, ~24 h drying, 1 h drawing). To scale up this process and minimize production time, three modifications are required—(1) the drying time should be minimized through some form of expedited solvent removal, such as continuously feeding the film through a hot oven (commercially used process in materials fabrication); (2) the drawing system should be reconfigured from a single-draw-stage, multiple-pass setup to a multiple-draw-stage, single-pass layout; and (3) the extrusion and drawing systems should be mated together with an automated conveyor belt-type system that directly passes the films through the drying oven directly into the drawing system. In the current setup, since ambient temperature solvent removal comprises the bulk of the fabrication time, films are extruded into individual ~20 cm long samples. Extrusion into discrete samples rather than a single continuous film also represents a discontinuity in the fabrication process and requires additional film handling by an operator. A true continuous process used in an industrial setting would see the extrusion system mated to the drawing platform via a conveyor belt. In this setup, rather than discrete extrusion samples, one continuous length of polymer would be continuously extruded from the chamber onto the conveyor belt; passed through an oven for accelerated drying; and then directly fed into the drawing platform; drastically reducing fabrication time and operator intervention. This type of setup would require a further change to the drawing platform, in the rather than multiple passes through the system currently required to obtain high draw ratios, multiple sets of drawing rollers would be place in series such that the film only makes a single pass through the system. This setup would eliminate both the long drying step as well as lead to greater system automation. The approach to use a single-draw-stage and multiple pass configuration in this work was consciously chosen as it allows greater control for evaluating and optimizing effects of draw ratio and umber of passes, both of which are actively undergoing study. In conclusion, this platform design, demonstration, and characterization provides a new approach to fabricate HAPFs with enhanced material properties for various industrial and biomedical applications in a commercially appealing form factor.

The subscript numbers refer to the references listed herein. The contents of all these References are incorporated herein by reference.

REFERENCES

[1]Lepri, S., Livi, R., & Politi, A. Thermal conduction in classical low-dimensional lattices. *Physics Reports* 377, 1-80 (2003).

[2]Henry, A., & Chen, G. High thermal conductivity of single polyethylene chains using molecular dynamics simulations. *Physical Review Letters* 101, 235502-1-4 (2008).

[3] Mergenthaler, D. B., Pietralla, M., Roy, S., & Kilian, H. G. Thermal conductivity in ultraoriented polyethylene. *Macromolecules* 25, 3500-3502 (1992).

[4] Shen, S., Henry, A., Tong, J., Zheng, R., & Chen, G. Polyethylene nanofibres with very high thermal conductivites. *Nat Nano* 5, 251-255 (2010).

[5] Smith, P., & Lemstra, P. Ultra-high-strength polyethylene filaments by solution spinning/drawing. *J Mater Sci* 15, 505-514 (1980).

[6] Choy, C. L., Fei, Y., & Xi, T. G. Thermal conductivity of gel-spun polyethylene fibers. *Journal of Polymer Science Part B: Polymer Physics* 31, 365-370 (1993).

[7] Agari, Y., & Uno, T. Thermal conductivity of polymer filled with carbon materials: Effect of conductive particle chains on thermal conductivity. *Journal of Applied Polymer Science* 30, 2225-2235 (1985).

[8] Li, D., & Xia, Y. Electrospinning of nanofibers: Reinventing the wheel? *Advanced Materials* 16, 1151-1170 (2004).

[9] Feng, et al. Well-aligned polyaniline/carbon-nanotube composite films grown by in-situ aniline polymerization. *Carbon* 41, 1551-1557 (2003).

[10] Peacock, A. J., *Handbook of Polyethylene: Structures: Properties, and Applications* (1st ed. (CRC Press).

[11] Chae, H. G., & Kumar, S. Making Strong Fibers. *Science* 319, 908-909 (2008).

[12] Chanda, M., & Roy, S. K., *Plastics fabrication and recycling*. (CRC Press, 2008).

[13] Cao, B.-Y., Kong, J., Xu, Y., Yung, K.-L., & Cai, A. Polymer nanowire arrays with high thermal conductivity and superhydrophobicity fabricated by a nano-molding technique. *Heat Transfer Engineering* 34, 131-139 (2013).

[14] Singh, V., et al. High thermal conductivity of chain-oriented amorphous pholthiophene. *Nat Nano* 9, 384-390 (2014).

[15] Huang, Z.-M., Zhang, Y.-Z., Kotaki, M., Ramakrishna, S. A review on polymer nanofibers by electrospinning and their applications in nanocomposites. *Composites Science and Technology* 63, 2223-2252 (2003).

[16] Katta, P., Alessandro, M., Ramsier, R. D., & Chase, G. G. Continuous electrospinning of aligned polymer nanofibers onto a wire drum collector. *Nano Letters* 4, 2215-2218 (2004).

[17] Sundaray, B., et al. Electrospinnning of continuous aligned polymer fibers. *Applied Physics Letters* 84, 1222-1224 (2004).

[18] Frenot, A., & Chronakis, I. S. Polymer nanofibers assembled by electrospinning. *Current Opinion in Colloid & Interface Science* 8, 64-75 (2003).

[19] Li, D., Wang, Y., & Xia, Y. Electrospinning nanofibers as uniaxially aligned arrays and layer-by-layer stacked films. *Advanced Materials* 16, 361-366 (2004).

[20] Kunugi, T., Oomori, S., & Mikami, S. Preparation of ultra-high modulus polyethylene films by the zone-annealing method. *Polymer* 29, 814-820 (1988).

[21] Langer, L., Billaud, D., & Issi, J.-P. Thermal conductivity of stretched and annealed poly (p-phenylene sulfide) films. *Solid State Communications* 126, 353-357 (2003).

[22] Smith, D. E., Babcock, H. P., & Chu, S. Single-polymer dynamics in steady shear flow. *Science* 283, 1724-1727 (1999).

[23] Xie, M., & Li, H. Viscosity reduction and disentanglement in ultrahigh molecular weight polyethylene melt: Effect of blending with polypropylene and poly(ethylene glycol). *European Polymer Journal* 43, 3480-3487 (2007)

[24] Rastogi, S., et al. Heterogeneity in polymer melts from melting of polymer crystals. *Nat Mater* 4, 635-641 (2005).

[25] Smook, J., & Pennings, J. Influence of draw ratio on morphological and structural changes in hot-drawing of UHMW polyethylene fibres as revealed by DSC. *Colloid & Polymer Sci* 262, 712-722 (1984).

[26] Tashiro, K., Kobayashi, M., & Tadokoro, H. Calculation of three-dimensional elastic constants of polymer crystals, 2, Application to orthohombic polyethylene and poly(vinyl alcohol). *Macromolecules* 11, 914-918 (1978).

[27] Gururajan, G., & Ogale, A. A. Real-time crystalline orientation measurements during low-density Polyethylene blown film extrusion using wide-angle x-ray diffraction. *Polymer Engineering & Science* 52, 1532-1536 (2012).

[28] Strobl, G., *The physics of polymers*, 3rd ed. (Springer, 2007).

[29] Papkov, D., et al. Simultaneously Strong and Tough Ultrafine Continuous Nanofibers. *ACS Nano* 7, 3324-3331 (2013).

What is claimed is:

1. Process for continuous fabrication of polymer films comprising:
    pumping a polymer-solvent solution of entangled polymer molecular chains through a cylindrical extrusion chamber;
    subjecting the polymer-solvent solution of entangled polymer molecular chains to Couette flow as the polymer-solvent solution of entangled polymer molecular chains is pumped through the cylindrical extrusion chamber, to disentangle the entangled polymer molecular chains of the polymer-solvent solution;
    pumping polymer-solvent solution including disentangled polymer molecular chains out of the cylindrical extrusion chamber in an outlet direction that is tangential to the cylindrical extrusion chamber to maintain disentanglement of the disentangled polymer molecular chains in the polymer-solvent solution;
    dispensing the polymer-solvent solution including disentangled polymer molecular chains as an extruded polymer film including disentangled polymer molecular chains onto a flat substrate;
    freezing the extruded polymer film on the flat substrate to cause gelation of the polymer film;
    drying the polymer film on the flat substrate to mechanically stabilize the polymer film; and
    mechanically drawing the dried polymer film under a constant drawing force sufficient to align the disentangled polymer molecular chains in the polymer film by plastic deformation of the polymer film.

2. The process of claim 1 wherein the polymer-solvent solution comprises ultra-high molecular weight polyethylene.

3. The process of claim 1 wherein drying the polymer film comprises drying by one or more methods selected from the group consisting of mechanical pressing, evaporation or heating of the extruded polymer film, to form a dried polymer film.

4. The process of claim 1 wherein the Couette flow has a shear rate greater than 1000 s$^{-1}$.

5. The process of claim 1 wherein the mechanical drawing step is performed within a heated enclosure.

6. The process of claim 1 wherein after the mechanical drawing step, the length of the film is greater than 50 times its original length.

7. The process of claim 1 wherein temperature of the Couette flow is in the range of 50-140° C.

8. The process of claim 1 wherein the mechanical drawing step is performed on a continuous drawing system having dual feed spools and a heated enclosure housing dual sets of draw rollers.

9. The process of claim 1 wherein the mechanical drawing step is conducted with pneumatic cylinders to provide polymer film clamping between draw rollers.

10. The process of claim 1 wherein the mechanical drawing step comprises a mechanical draw selected from the group consisting of multiple-pass draw or single pass draw.

11. The process of claim 1 further comprising transferring the polymer film, after drying, for mechanical drawing, on an automated conveyor belt.

12. The process of claim 1 wherein the polymer-solvent solution includes particles to enhance thermal material properties of the polymer film.

13. The process of claim 12 wherein the particles are graphite or graphene.

14. The process of claim 1 wherein the polymer-solvent solution includes particles to enhance mechanical strength and electrical conductivity of the polymer film.

* * * * *